United States Patent [19]

Goodfellow

[11] 4,137,033

[45] Jan. 30, 1979

[54] MANUFACTURE OF PNEUMATIC TIRES

[75] Inventor: Anthony G. Goodfellow, Maghull, near Liverpool, England

[73] Assignee: Dunlop Limited, London, England

[21] Appl. No.: 819,161

[22] Filed: Jul. 26, 1977

Related U.S. Application Data

[62] Division of Ser. No. 579,238, May 20, 1975, Pat. No. 4,052,496.

[30] Foreign Application Priority Data

May 28, 1974 [GB] United Kingdom ............... 23576/74

[51] Int. Cl.² .................... B29H 3/10; B29G 3/00; B29H 5/02
[52] U.S. Cl. .................... 425/542; 425/572; 425/588; 425/127; 425/128; 156/125
[58] Field of Search .................... 425/35, 52, 40, 13, 425/130, 185, 190, 192, 193, 195, 542, 43, 577, 589; 156/125

[56] References Cited

U.S. PATENT DOCUMENTS

| 2,672,914 | 3/1954 | Weigold et al. | 425/32 X |
| 2,710,425 | 6/1955 | Rhodes | 425/43 X |
| 2,724,425 | 11/1955 | Ostling | 156/125 |
| 2,744,290 | 5/1956 | Corson | 425/13 |
| 3,457,594 | 7/1969 | Bavdou | 425/35 |
| 3,645,655 | 2/1972 | Benege | 425/35 |
| 4,059,375 | 11/1977 | Koch et al. | 425/589 |

Primary Examiner—J. Howard Flint, Jr.
Attorney, Agent, or Firm—Stevens, Davis, Miller & Mosher

[57] ABSTRACT

A pneumatic tire is moulded using a mould core of cured rubber the radial sectional shape of which is the same as the internal radial sectional configuration of the finished tire. The opposite sides of the core are supported by fitting plates while a tread portion of tire is moulded onto the exposed outer periphery of the core. Thereafter the side plates are removed in turn and replaced by sidewall mould halves enabling sidewalls to be moulded against the core in contact with the tread portion.

3 Claims, 1 Drawing Figure

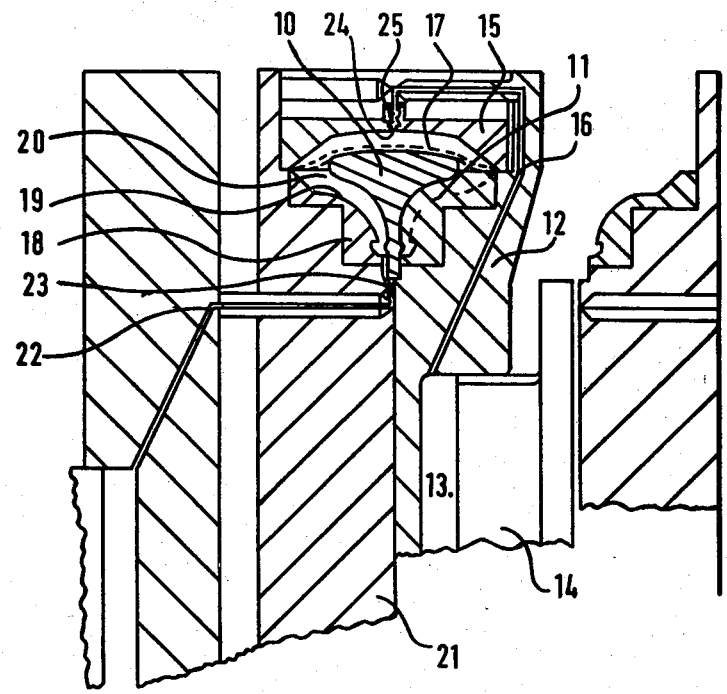

MANUFACTURE OF PNEUMATIC TIRES

This is a division of application Ser. No. 579,238 filed May 20, 1975, now U.S. Pat. No. 4,052,496.

This invention relates to the manufacture of pneumatic tires.

According to the invention there is provided an apparatus for the manufacture of a pneumatic tires in which the tread portion of the tires is initially molded from uncured rubber in an annular mould cavity the radially inner surface of the cavity being the surface of a mould core of cured rubber, the mould core having substantially the shape of the interior of the tires to be moulded, and being supported during moulding of the tread by rigid side plates which engage the sidewall moulding surface of the core, removing said side plates after moulding said tread, replacing them by mould halves defining sidewall moulding cavities against the sidewall moulding surface of the core and forcing uncured rubber into the sidewall moulding cavities to mould said sidewalls onto the tread.

The moulding of the tread and of the sidewalls may be by injection or transfer moulding. Preferably the sidewalls are moulded not simultaneously but in succession to avoid movement of the core.

Preferably an inextensible reinforcing belt is inserted into the tread mould cavity prior to moulding the tread, the uncured tread rubber thus being moulded onto a pre-assembled reinforcement. The sidewalls preferably do not contain plies of reinforcing fabric, and consist entirely of rubber except, possibly, for an inextensible bead core.

The cured rubber core is preferably in a state of radially inward compression when the tread is moulded the reinforcement around the core thus being in a state of tension. The manner in which this is achieved is more fully described in our co-pending U.S. Patent Application Ser. No. 579,424, filed May 21, 1975, now Pat. No. 4,057,446.

The rubber of the sidewalls and tread is preferably cured prior to removal of the core, the latter being preferably coated with a suitable release agent to permit its removal. The removal of the core is facilitated by the fact that it is made of rubber which is flexible. It will be appreciated that whilst the rubber core is rigidly supported by the mould halves or side plates its very high modulus in compression enables it to act as a suitable core. When the support is removed the flexibility of the core enables it to be readily distorted to be removed from the moulded tires.

Preferably the uncured rubber used in moulding the tread portion of the tires has been mechanically worked by a feed screw, sufficiently to destroy its nerve or memory without starting it on its cure cycle, i.e. the rubber is warm but is below the threshold temperature at which its cure rate begins to rise rapidly.

The invention will now be described in more detail by way of example only with reference to the accompanying drawing which is a cross-sectional view of a moulding apparatus.

The drawing is in two halves (a) and (b) of which (a) illustrates the apparatus as used during moulding of the tread and (b) illustrates the apparatus as used during moulding of the sidewalls.

As shown in part (a) the apparatus consists of a rubber core 10, supported by a side plate 11 contoured to the shape of the core 10. An example of the core or former 10 and its manner of use is described in copending U.S. Patent Application Ser. No. 579,424. The side plate 11 is carried on a press platen 12 in the centre of which is a cavity 13 which forms a transfer chamber into which worked uncured rubber may be loaded through an inlet (not shown). A plunger 14 co-operates with the cavity 13 to permit the rubber to be forced from the chamber by compressing the plunger 14 into the cavity 13.

The interior and exterior surfaces of the tread moulding cavity are defined by the core 10 and a tread moulding ring 15. The ring 15 is divided along its centre line, by an annular gate 24 surrounded by an annular reservoir 25 connected by runners 16 to the cavity 13 to permit the rubber to be transferred from the cavity 13 into the tread moulding cavity. Reference is made to co-pending U.S. Patent Application Ser. No. 581,587 filed May 28, 1975, now U.S. Pat. No. 4,055,619, for a clear understanding of the nature and function of the gate 24 and reservoir 25.

An inextensible reinforcing band 17 is located on the core before inserting the core into the tread moulding cavity.

After moulding the tread and partially curing the tread rubber the side plate 11, plate 12 and plunger 14 are replaced by a mould half 18 carrying a sidewall moulding surface 19 which is brought up to the core 10 to define a sidewall mould cavity 20. The mould half 18 is supported on a plate 21 containing runners 22,23 from an injection system (not shown).

Sidewall rubber is then injected into the cavity 20, and joins with the tread rubber. The other sidewall is similarly moulded in a subsequent operation since it would be difficult to balance the flow into the two sidewall cavities if both were filled simultaneously.

The tires is then cured whilst maintaining the temperature of the runners below the threshold temperature. The plates 21 are taken away and the core 10 removed from the interior of the cured tires.

It will be appreciated that throughout this process it is necessary to control accurately the temperatures of all the parts of the apparatus. This is achieved by the provision of many channels for heating and cooling fluids which are not shown in the drawing.

The apparatus of this invention may be utilized to manufacture tires of conventional shapes i.e. having convex sidewalls but it is also particularly suitable for the manufacture of tires having concave sidewalls which operate in compression as described, for example, in U.S. Pat. No. 3,805,868.

I claim:

1. An apparatus for the manufacture of a pneumatic tire having a tread portion and sidewalls, said apparatus comprising:

an annular solid mold core of cured rubber, said core having opposing sides defining sidewall molding surfaces and a radially outer periphery having a shape in radial section similar to the internal radial sectional shape of a tire to be molded;

a pair of rigid side plates each having a contour similar to that of one side of the core, said side plates being movable toward one another to contact and support the opposite sides of the core during molding of the tread portion of the tire on said core;

a tread molding ring adapted to surround the core when the latter is supported by said plates to define with the radially outer periphery of the core a mold cavity for the tire tread portion;

a pair of sidewall mold halves, said mold halves being substituted for said side plates after the tire tread portion is molded, each of said sidewall mold halves being shaped to define with a respective one of the sidewall surfaces of the core in a molding position a mold cavity for one of the tire sidewalls; and said solid core being removable from the interior of the tire after manufacture.

2. An apparatus as claimed in claim 1, wherein each side plate is carried by a platen at least one of which has a transfer chamber for the reception of uncured rubber, a piston reciprocable in the transfer chamber for displacing uncured rubber therefrom and runner means for communicating the transfer chamber with the tread ring for charging the mold cavity for the tread portion with uncured rubber from the transfer chamber through the tread ring.

3. An apparatus as claimed in claim 1, further comprising means for charging each of the sidewall mold cavities with uncured rubber, each sidewall mold half is supported by a platen containing runners for communicating the associated sidewall mold cavity with said means for charging the same with uncured rubber.

* * * * *